United States Patent
Higashino et al.

(10) Patent No.: US 7,779,868 B2
(45) Date of Patent: Aug. 24, 2010

(54) DUCT STRUCTURE

(75) Inventors: Tatsuya Higashino, Yamato (JP);
Kenichi Sakai, Hadano (JP); Tatsuya Fujikawa, Isehara (JP); Satoshi Muramatsu, Ebina (JP); Hiroshi Imaizumi, Kobe (JP); Michio Kijima, Kobe (JP)

(73) Assignees: Nissan Motor Co., Ltd., Yokohama-shi (JP); Tigers Polymer Corporation, Toyonaka-shi (JP)

( * ) Notice: Subject to any disclaimer, the term of this patent is extended or adjusted under 35 U.S.C. 154(b) by 502 days.

(21) Appl. No.: 11/822,279

(22) Filed: Jul. 3, 2007

(65) Prior Publication Data
US 2008/0017262 A1    Jan. 24, 2008

(30) Foreign Application Priority Data
Jul. 5, 2006    (JP) .............................. 2006-185861

(51) Int. Cl.
*F15D 1/04* (2006.01)
(52) U.S. Cl. ......................... 138/39; 138/37; 138/177; 138/178
(58) Field of Classification Search ............. 138/37, 138/39, 109, 178, 177
See application file for complete search history.

(56) References Cited

U.S. PATENT DOCUMENTS

| | | | | |
|---|---|---|---|---|
| 4,161,395 A | * | 7/1979 | Brown et al. ................. | 96/177 |
| 4,163,723 A | * | 8/1979 | Romano et al. ............. | 210/319 |
| 4,176,769 A | * | 12/1979 | Cudby et al. ................ | 222/591 |
| 4,270,975 A | * | 6/1981 | Bennett ..................... | 159/27.2 |
| 5,154,742 A | * | 10/1992 | Gault et al. ................ | 55/315.2 |

FOREIGN PATENT DOCUMENTS

| CN | 2427764 Y | 4/2001 |
|---|---|---|
| JP | 2002-223507 A | 8/2002 |

* cited by examiner

*Primary Examiner*—Patrick F Brinson
(74) *Attorney, Agent, or Firm*—Foley & Lardner LLP (57) ABSTRACT

A duct structure, includes: a vessel forming therein a chamber, the vessel including: an inlet port, an outlet port, wherein the vessel is configured such that a fluid flows into the chamber through the inlet port and flows out of the chamber through the outlet port, and a swirling flow suppressing member disposed in a position inside the chamber adjacent to the outlet port, wherein the swirling flow suppressing member is configured to suppress a swirling flow from occurring to or adjacent to the outlet port.

11 Claims, 14 Drawing Sheets

| SPACE DISTANCE H (mm) | IMPROVEMENT ALLOWANCE (EFFECT OF PRESSURE LOSS DECREASE) |
|---|---|
|  | 0.00 |
| 30 | 0.56 |
| 19 | 0.88 |
| 9 | 1.20 |
| 0 | 1.11 |
| -13 | 0.01 |

DUCT STRUCTURE

BACKGROUND OF THE INVENTION

1. Field of the Invention

The present invention relates to a duct structure including an inlet port and an outlet port.

2. Description of the Related Art

Japanese Patent Application Laid-Open No. 2002-223507 (=JP2002223507) discloses a conventional duct structure. For cooling, for example, a cell assembly (battery pack 24) installed to a vehicle, the conventional duct structure introduces a cooling air into an inner space (chamber) from inside a vehicle compartment through an inlet port, to thereafter exhaust the cooling air through an outlet port.

In the duct structure disclosed in JP2002223507, the air in the vehicle compartment is introduced into the battery pack 24 (into cell assembly enclosure) by way of the duct, thus cooling the cell assembly in the battery pack 24, to thereby suppress temperature increase of the cell assembly.

With the above conventional duct structure, a swirling flow is caused to a part where the outlet port of the duct is formed, thus increasing air vent resistance, thereby making it unlikely to bring about a certain performance (for example, cooling performance).

SUMMARY OF THE INVENTION

It is therefore an object of the present invention to provide a duct structure capable of suppressing air vent resistance increase which may be attributable to a swirling air flow caused to a part where an outlet port of a duct is formed.

According to an aspect of the present invention, there is provided a duct structure, comprising: a vessel forming therein a chamber, the vessel including: an inlet port, an outlet port, wherein the vessel is configured such that a fluid flows into the chamber through the inlet port and flows out of the chamber through the outlet port, and a swirling flow suppressing member disposed in a position inside the chamber adjacent to the outlet port, wherein the swirling flow suppressing member is configured to suppress a swirling flow from occurring to or adjacent to the outlet port.

The other object(s) and feature(s) of the present invention will become understood from the following description with reference to the accompanying drawings.

BRIEF DESCRIPTION OF THE DRAWINGS

FIG. 9 shows an air flow in the chamber with a swirling flow suppressing member, where FIG. 9A is an upper perspective view while

FIG. 10 shows an air flow in the chamber without the swirling flow suppressing member, where FIG. 10A is an upper perspective view while

FIG. 12 shows an effect of decreasing air vent resistance by a space distance from an opening edge of an outlet port to a lower edge of the swirling flow suppressing member, where FIG. 12A is a graph showing i) the space distance relative to ii) the effect (decreased pressure loss between the inlet port and the outlet port) while

DESCRIPTION OF THE PREFERRED EMBODIMENTS

Embodiment

Hereinafter, an embodiment of the present invention is to be explained in detail, referring to drawings.

Figure 1:
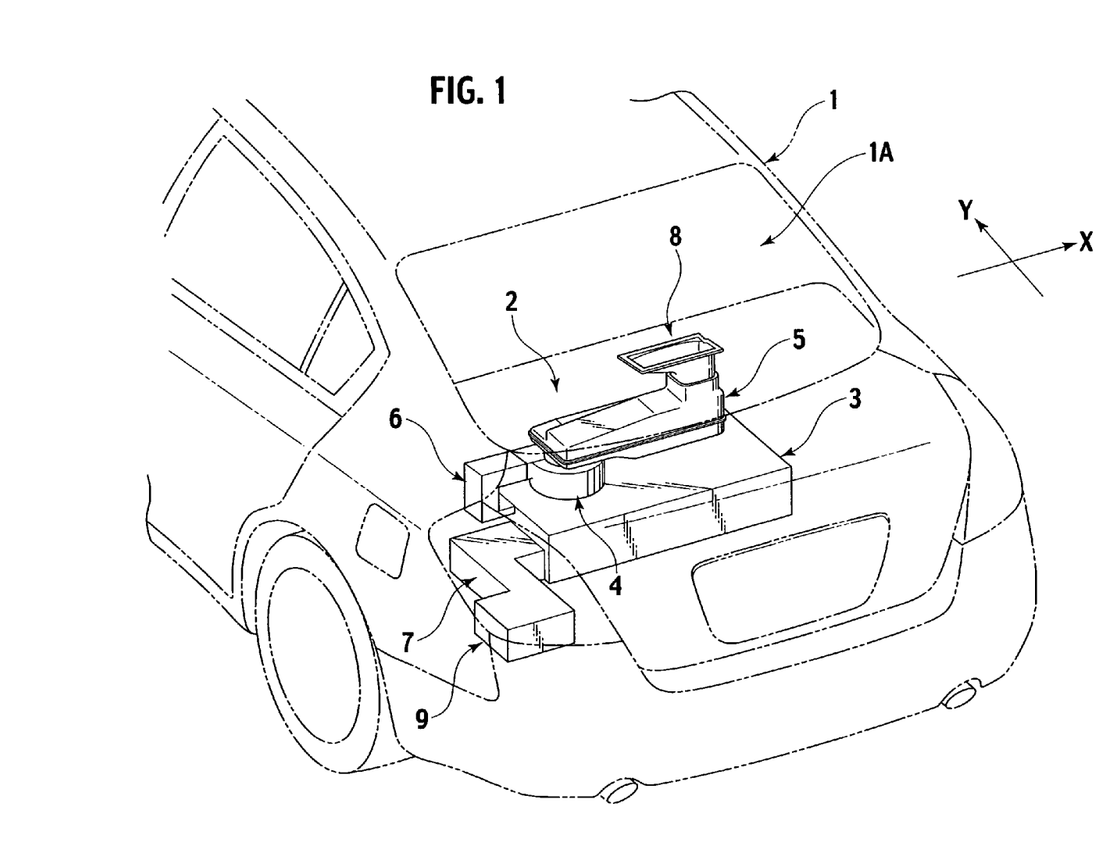
FIG. 1 is a perspective view showing an example of installing a duct structure to a vehicle, according to an embodiment of the present invention.

FIG. 1 is a perspective view showing an example of installing a duct structure to a vehicle, according to an embodiment of the present invention.

Figure 2:
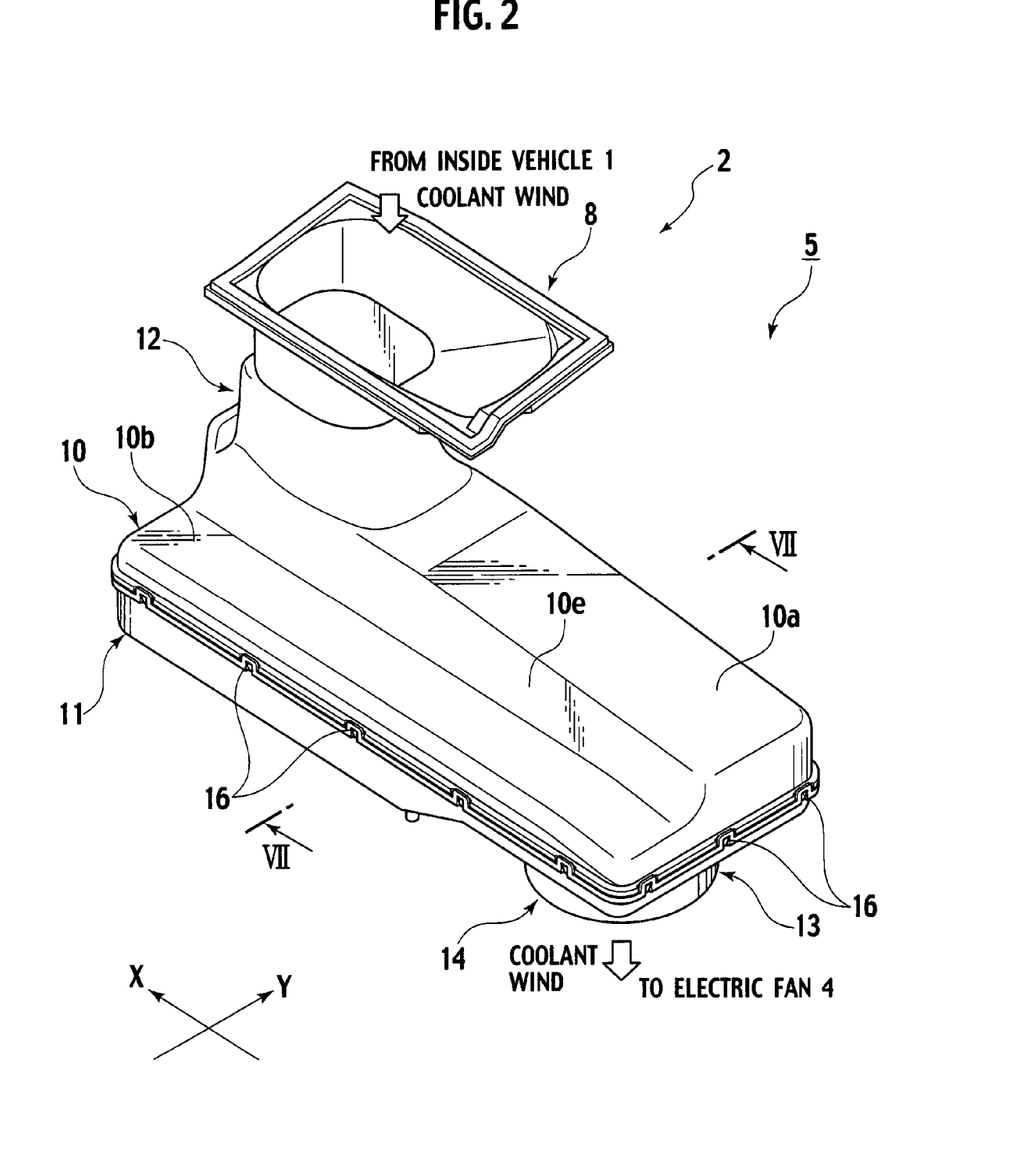
FIG. 2 is an upper perspective view of a chamber case of the duct structure, according to the embodiment of the present invention.

FIG. 2 is an upper perspective view of a chamber case of the duct structure.

Figure 3:
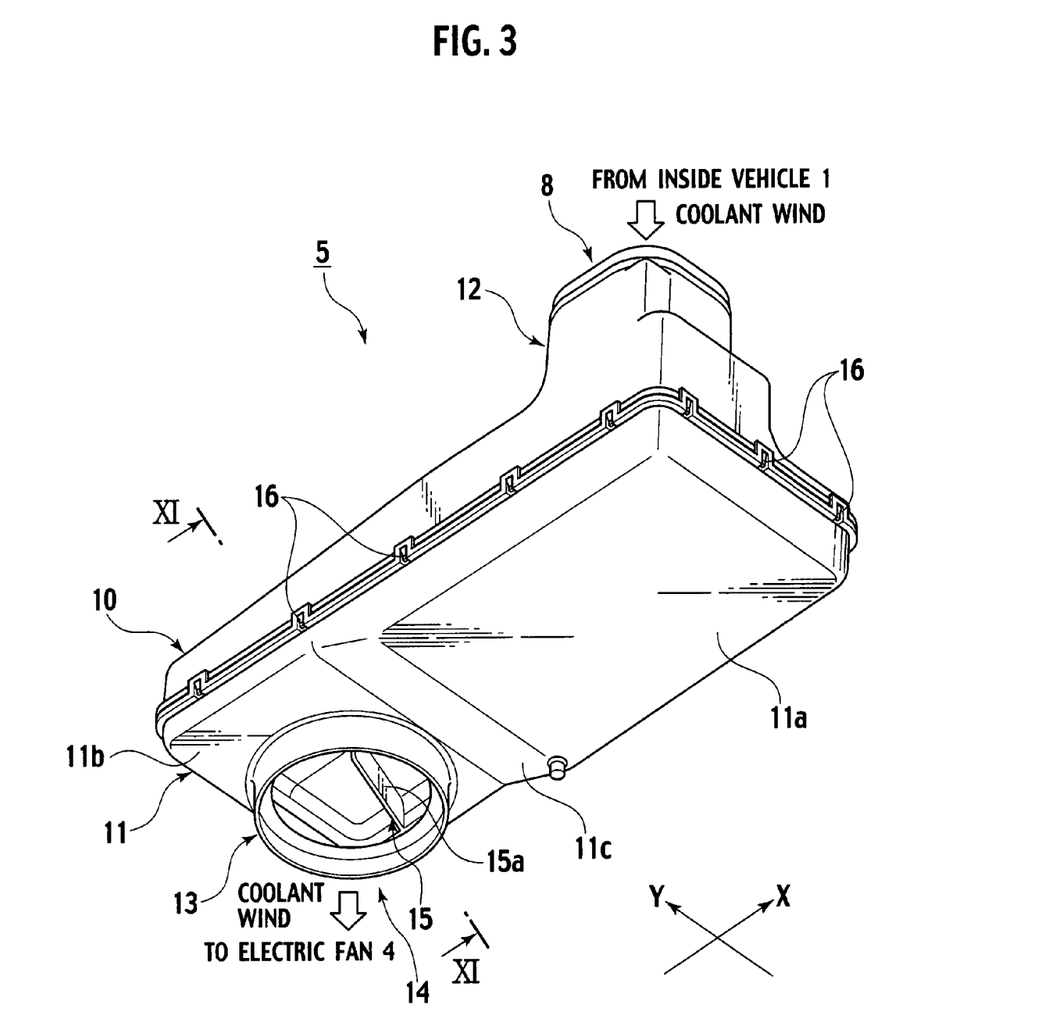
FIG. 3 is a lower perspective view of the chamber case of the duct structure, according to the embodiment of the present invention.

FIG. 3 is a lower perspective view of the chamber case.

Figure 4:
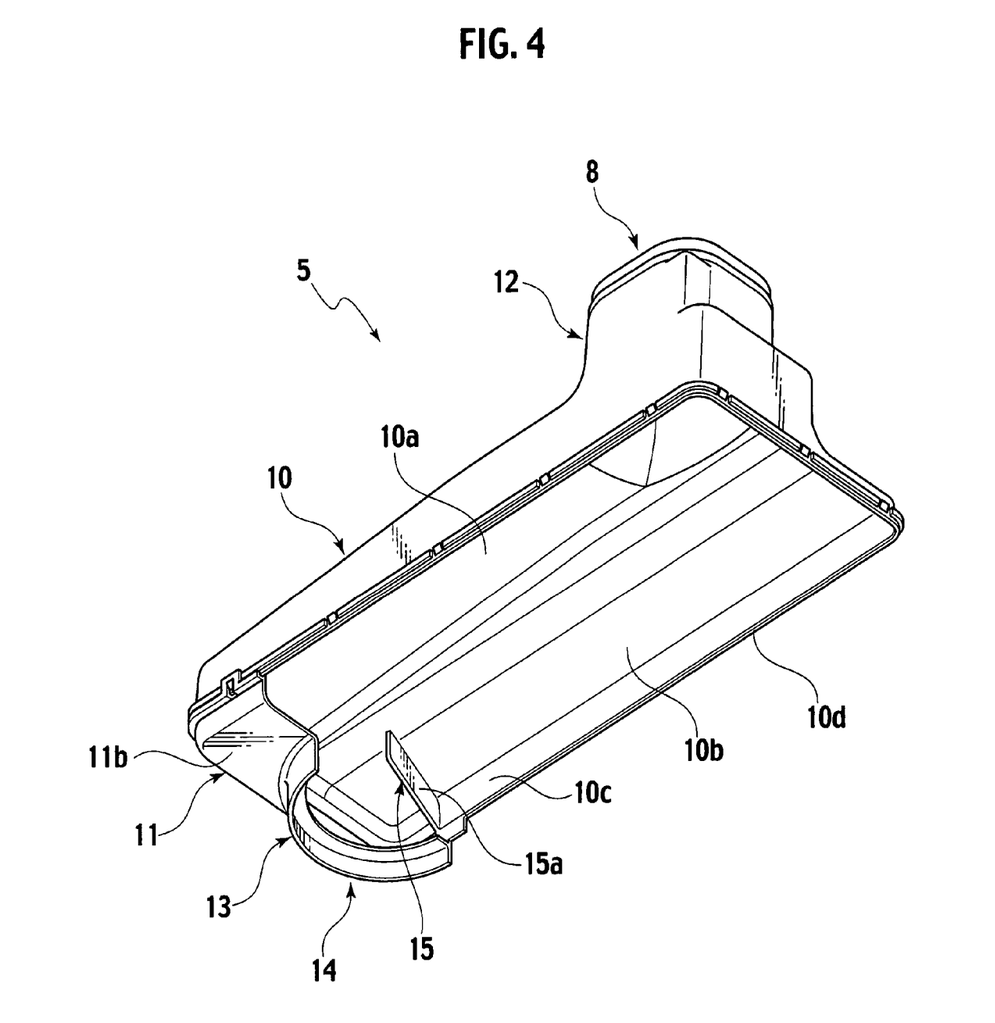
FIG. 4 a lower perspective view of a state where an inner part (chamber) of the chamber case is exposed by partly cutting away a lower case of the chamber case, according to the embodiment of the present invention.

FIG. 4 a lower perspective view of a state where an inner part (chamber) of the chamber case is exposed by partly cutting away a lower case of the chamber case.

Figure 5:
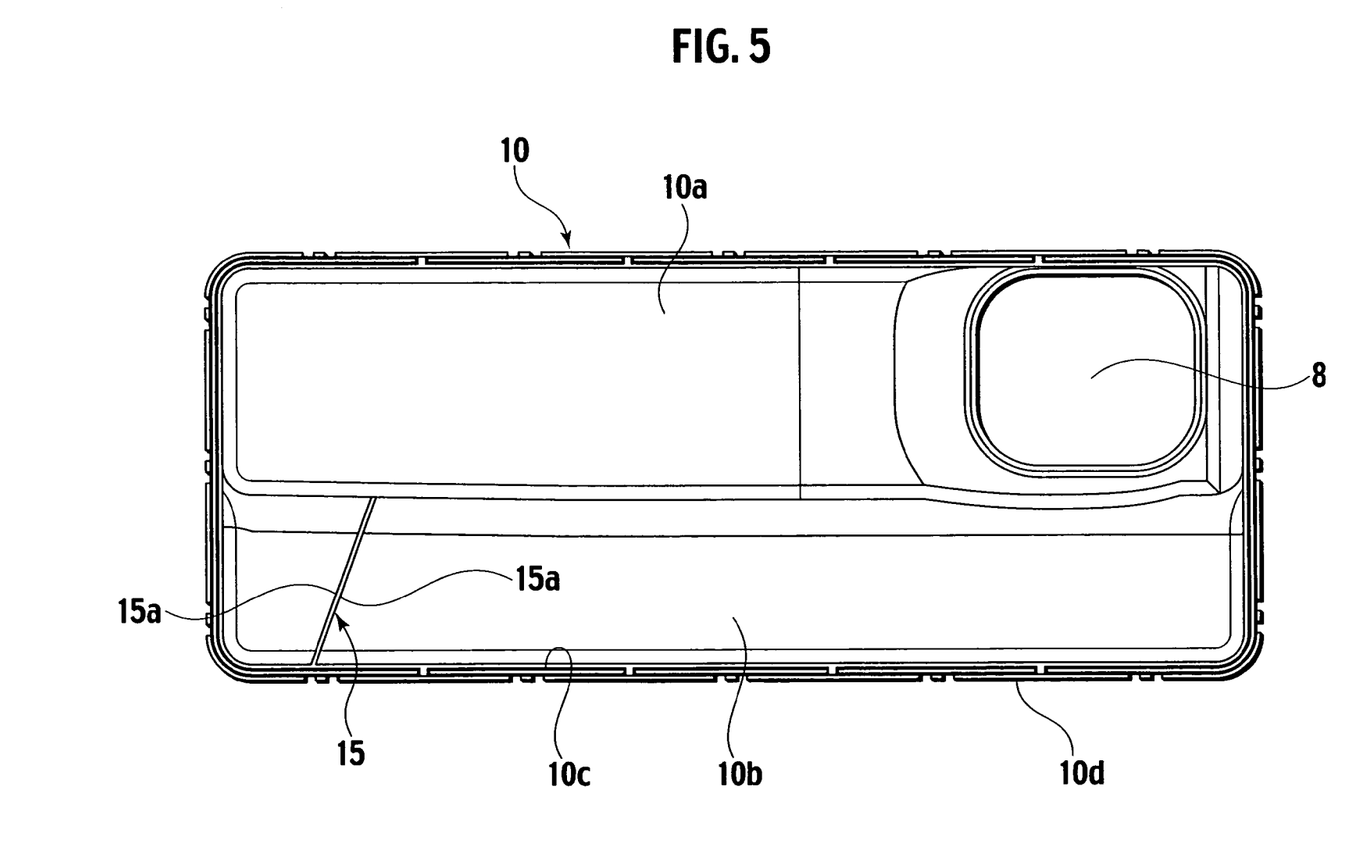
FIG. 5 is a lower plan view of an upper case of the chamber case of the duct structure, according to the embodiment of the present invention.

FIG. 5 is a lower plan view of an upper case of the chamber case.

Figure 6:
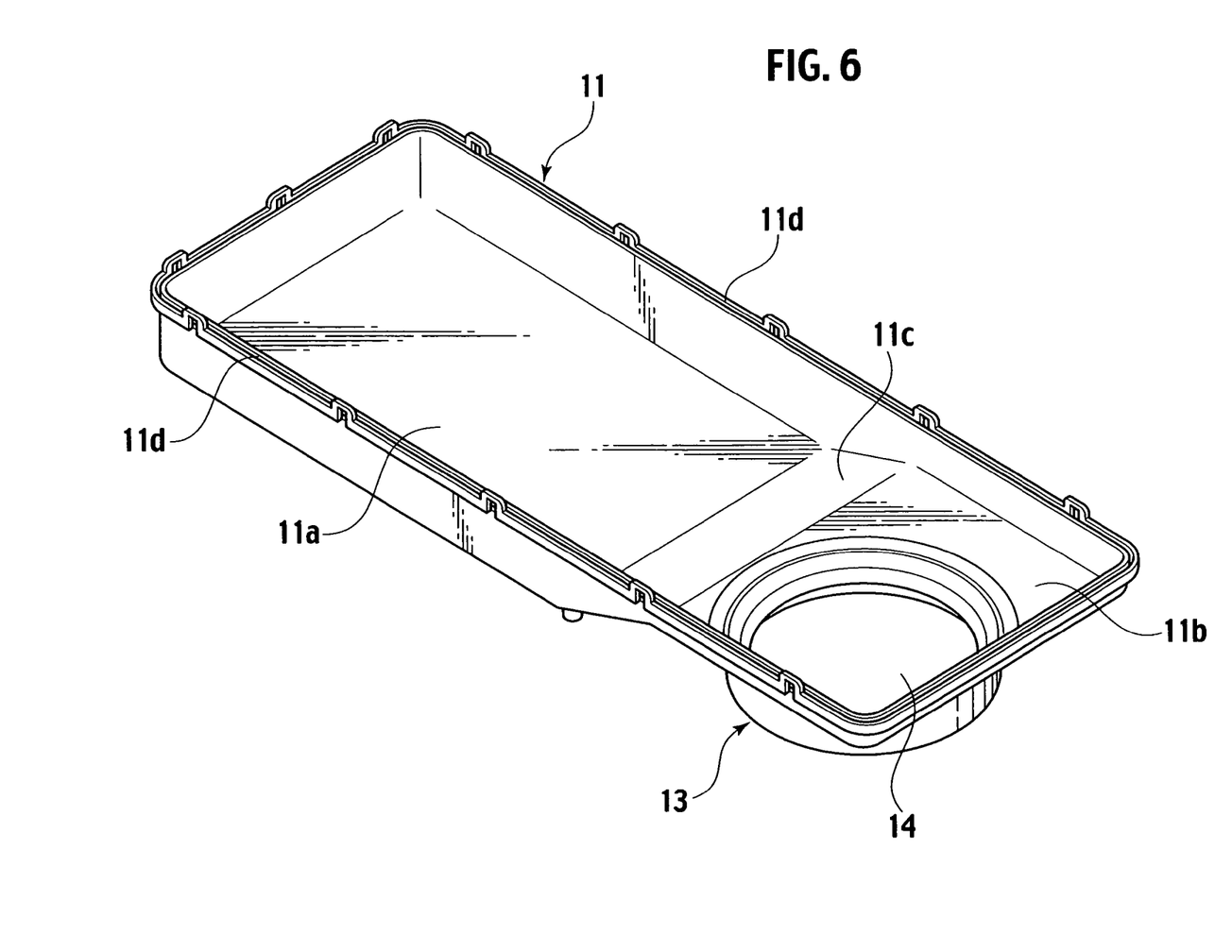
FIG. 6 an upper perspective view of the lower case of the chamber case of the duct structure, according to the embodiment of the present invention.

FIG. 6 an upper perspective view of the lower case.

Figure 7:
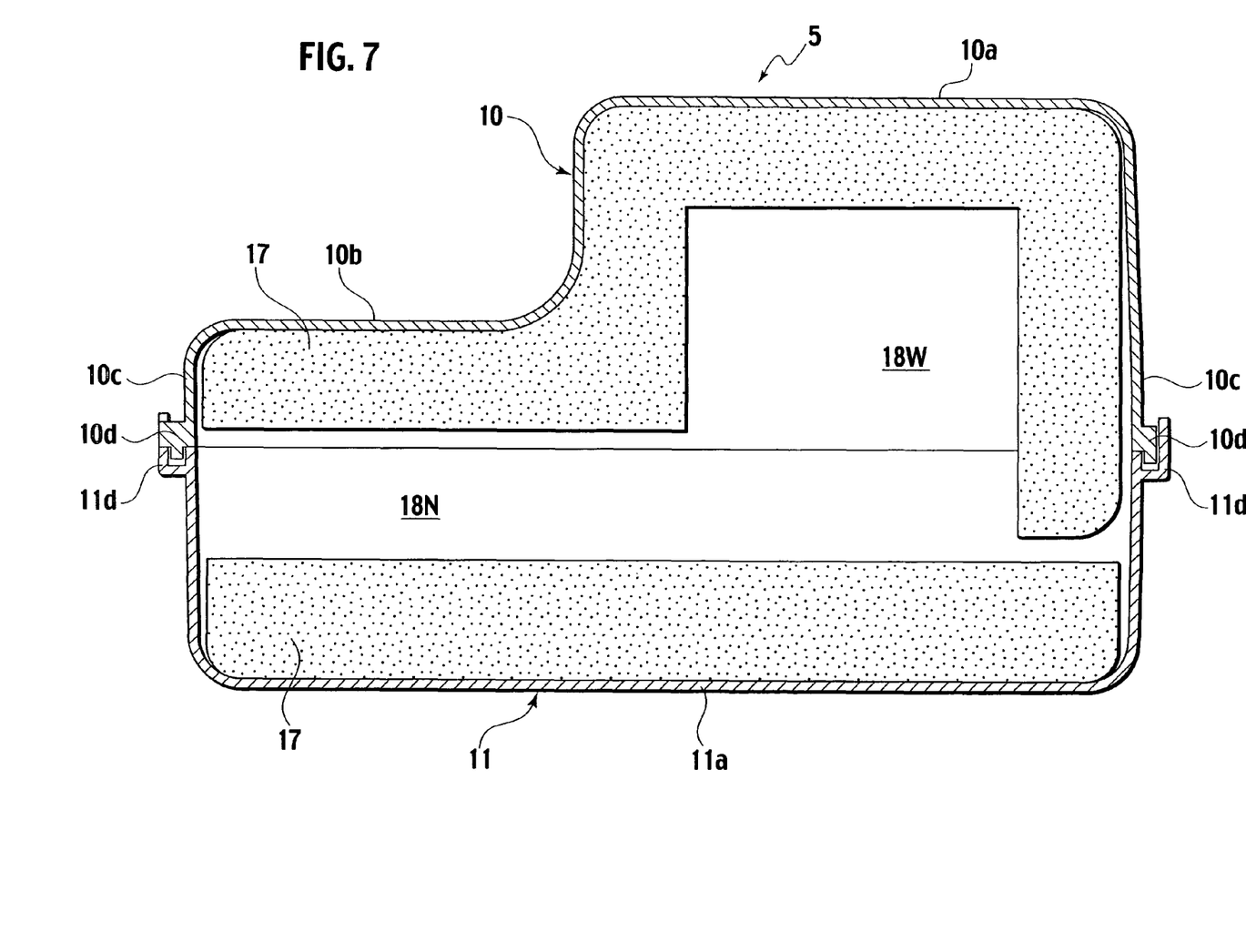
FIG. 7 is a cross sectional view taken along the line VII-VII in FIG. 2.

FIG. 7 is a cross sectional view taken along the line VII-VII in FIG. 2.

Figure 8:
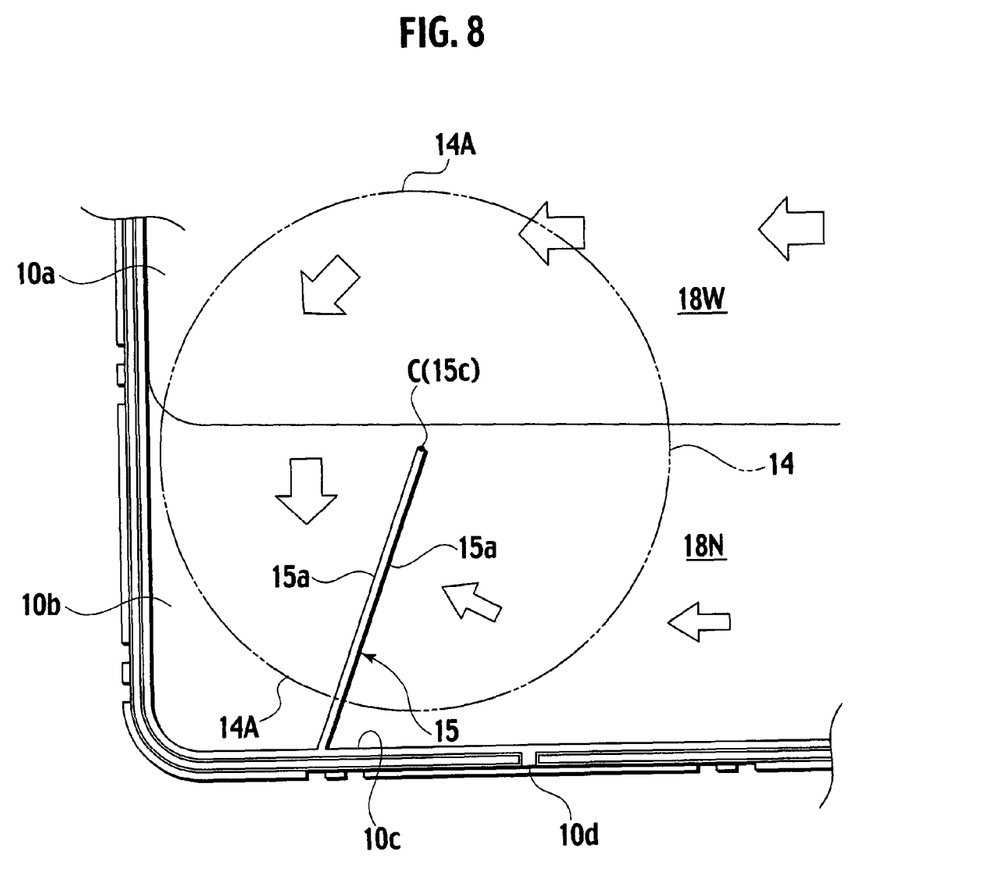
FIG. 8 is a lower plan view of a part (adjacent to an outlet port) of the upper case of the chamber case of the duct structure, according to the embodiment of the present invention.

FIG. 8 is a lower plan view of a part (adjacent to an outlet port) of the upper case.

Figure 9A:
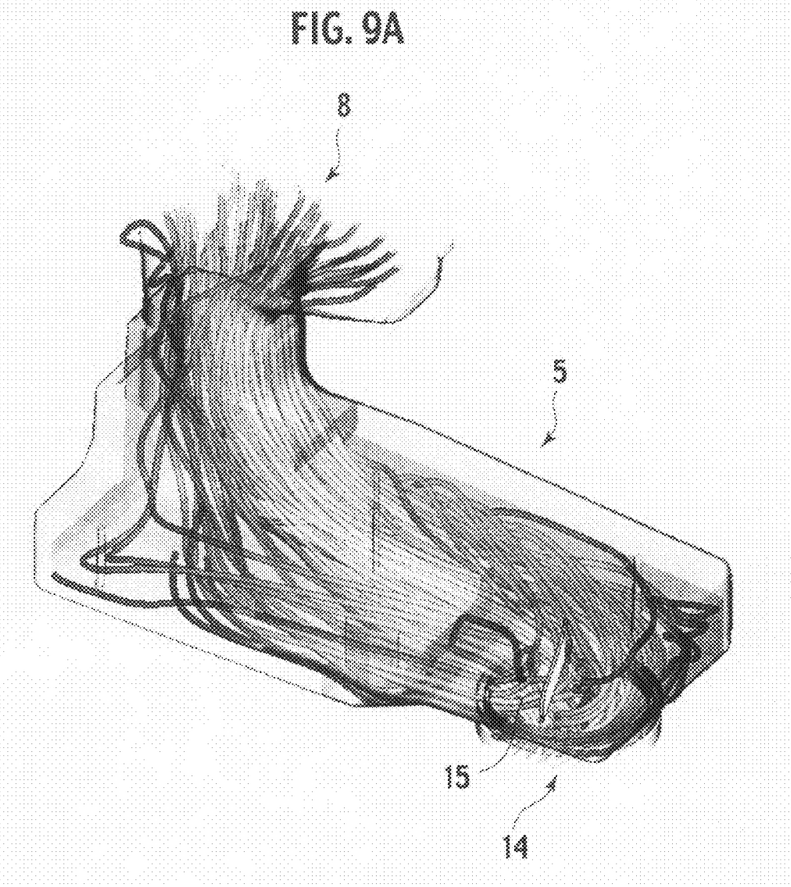
Figure 9B:
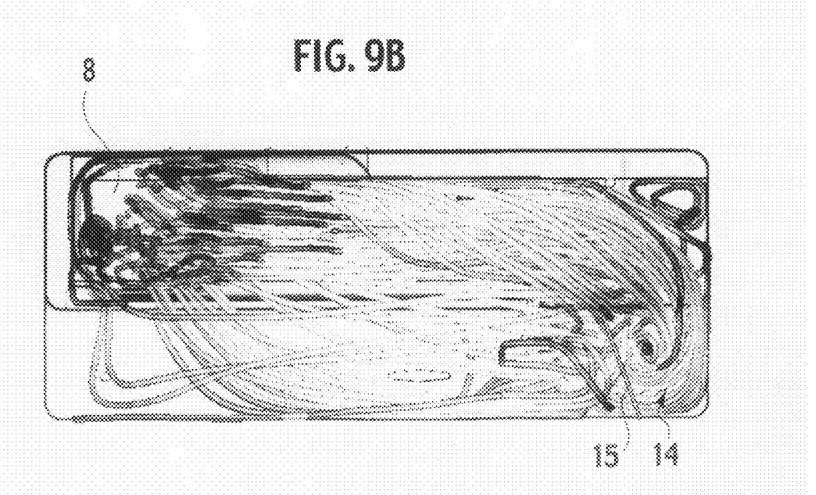
FIG. 9B is an upper plan view, according to the embodiment of the present invention.

FIG. 9 shows an air flow in the chamber with a swirling flow suppressing member, where FIG. 9A is an upper perspective view while FIG. 9B is an upper plan view, according to the embodiment of the present invention.

Figure 10A:
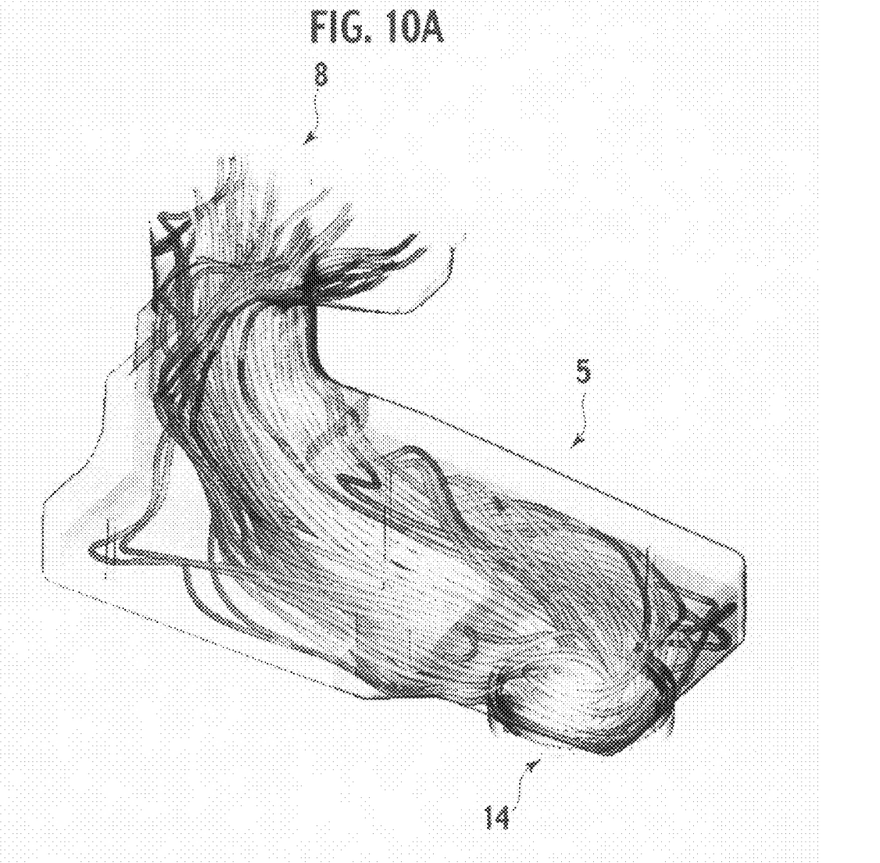
Figure 10B:
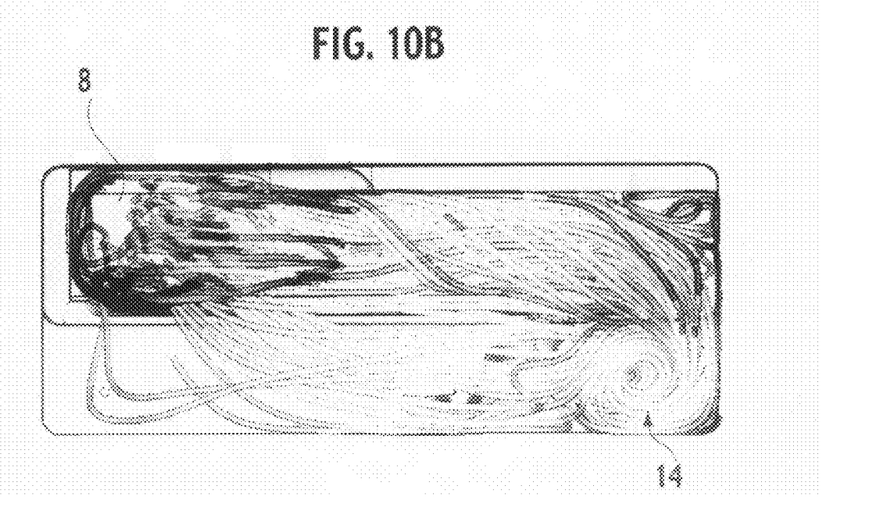
FIG. 10B is an upper plan view, according to a comparative example.

FIG. 10 shows an air flow in the chamber without the swirling flow suppressing member, where FIG. 10A is an upper perspective view while FIG. 10B is an upper plan view, according to a comparative example.

Figure 11:
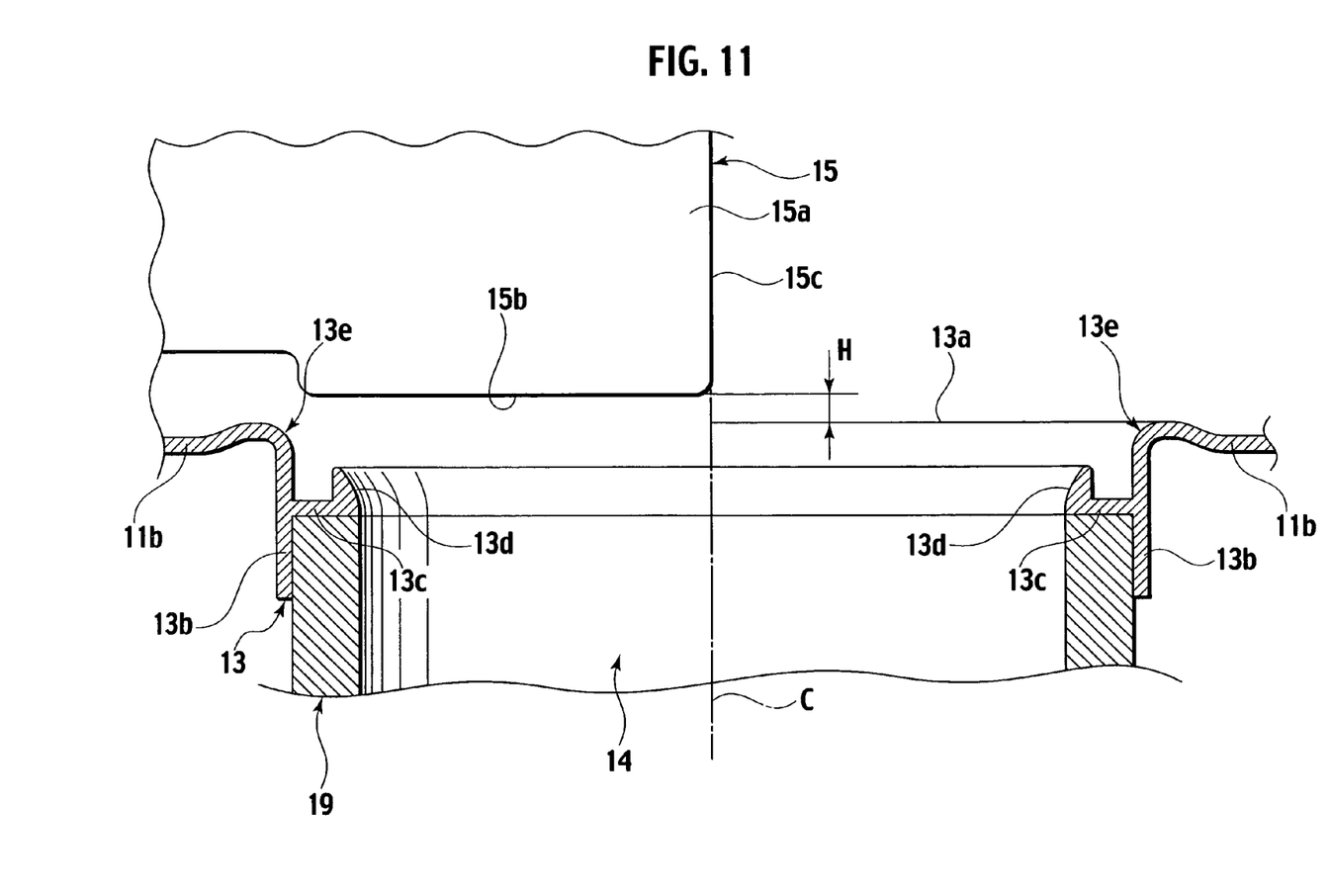
FIG. 11 is a cross sectional view taken along the line XI-XI in FIG. 3.

FIG. 11 is a cross sectional view taken along the line XI-XI in FIG. 3.

Figure 12A:
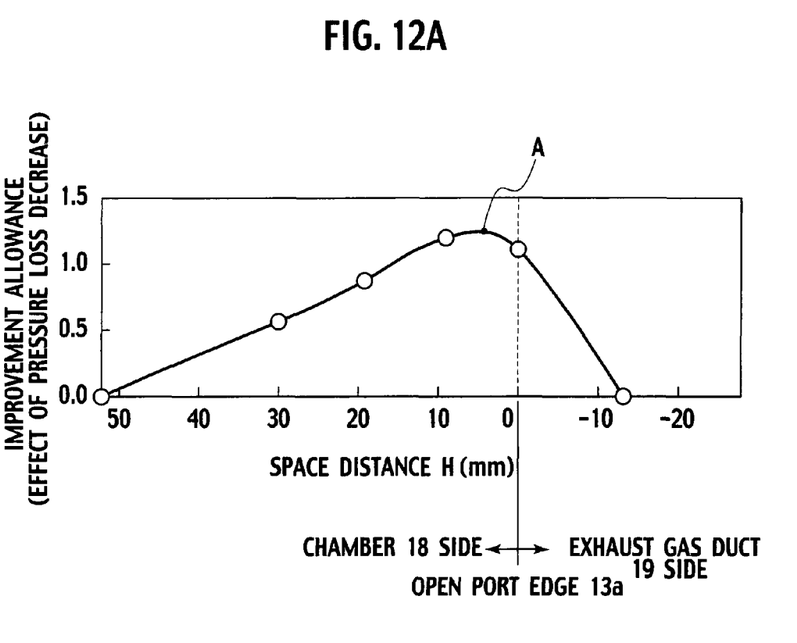
Figure 12B:
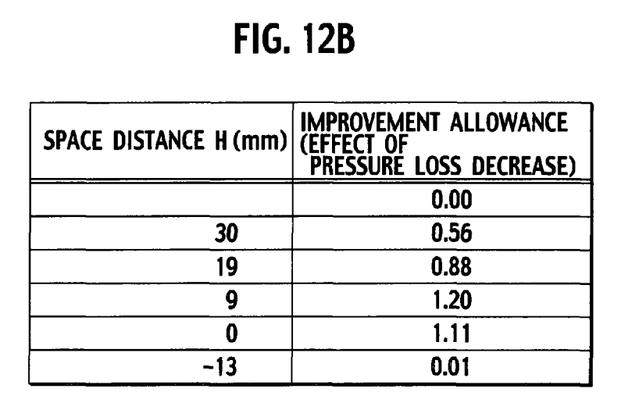
FIG. 12B shows a data table, according to the embodiment of the present invention.

FIG. 12 shows an effect of decreasing air vent resistance by a space distance from an opening edge of an outlet port to a lower edge of the swirling flow suppressing member, where FIG. 12A is a graph showing i) a space distance H relative to ii) the effect (decreased pressure loss between the inlet port and the outlet port) while FIG. 12B shows a data table.

In the specification, hereinafter, each of the directions (forward, rearward, upward, downward, and vehicular widthwise direction) is defined in a state where the dust structure is installed to the vehicle.

Hereinafter, the present invention is applied to a duct (otherwise referred to as "chamber case") for introducing a cooling air to a cell assembly for the vehicle, according to the embodiment. The present invention is, however, not limited to the above embodiment, and therefore can be properly applicable to other systems or devices including a duct-like structure.

As shown in FIG. 1, according to the embodiment, a cell assembly case 3 including a cell assembly is installed to a rearward of a rear seat of a vehicle 1. A duct structure 2 is so configured as to introduce an air as a fluid from inside a vehicle compartment 1A into the cell assembly case 3 and to exhaust outward the air from the cell assembly case 3. Specifically, operating an electric fan 4 introduces the air from an inlet port 8 opening on the vehicle compartment 1A's inner side, and then introduces the air into the cell assembly case 3 by way of a chamber case (first duct) 5, the electric fan 4 and a second duct 6. Moreover, the air moves from the cell assembly case 3, and then is exhausted, by way of a third duct 7, from an outlet opening 9 opening on the vehicle compartment 1A's outer side. Herein, the second duct 6 is provided for connecting the electric fan 4 with the cell assembly case 3's open port, and is not an essential structural element. Therefore, the second duct 6 can be properly omitted, for example, when the electric fan 4 and the cell assembly case 3 are disposed adjacent to each other.

As shown in FIG. 7, the chamber case 5 includes a first chamber 18N (otherwise referred to as "sub-flow channel 18N"—to be described afterward) and a second chamber 18W (otherwise referred to as "main flow channel 18W"—to be described afterward). Each of the first chamber 18N and the second chamber 18W has an inner wall face formed with a sound absorbing material 17.

The chamber 5 having an upper case 10 and a lower case 11, as a whole, forms a flat, thin, lengthy and rectangular cylinder case (box shape). According to the embodiment, a first direction X (longer) of the chamber case 5 extends along a vehicular widthwise direction. Moreover, according to the embodiment in FIG. 7, a flange 10d formed at a peripheral edge of the upper case 10 and a flange 11d formed at a peripheral edge of the lower case 11 are so mated with each other as to abut. As shown in FIG. 3, an engaging structure 16 (for example, snap fit structure) formed at the flanges 10d, 11d engages the flange 10d with the flange 11d.

Then, as shown in FIG. 2, a substantially rectangular inlet pipe 12 protrudes from an upper wall 10a of the upper case 10. Inside of the inlet pipe 12 forms the inlet port 8 for communicating the first and second chambers 18N, 18W with the vehicle compartment 1A. Herein, a head end part (upper end part) of the inlet pipe 12 is so expanded as to form a funnel shape.

Meanwhile, as shown in FIG. 3, a substantially cylindrical outlet pipe 13 protrudes from a second bottom wall 11b of the lower case 11. Inside of the outlet pipe 13 forms an outlet port 14 for communicating the first and second chambers 18N, 18W with an outlet duct 19 (FIG. 11) connected to the outlet pipe 13.

Herein, the inlet pipe 12 (and the inlet port 8) is, in plan view, disposed on a first side (rear side in the vehicular forward-rearward direction when the inlet pipe 12 is installed to the vehicle 1) in a second direction Y (FIG. 1) of the chamber case 5. Meanwhile, the outlet pipe 13 (and the outlet port 14) is, in plan view, disposed toward a second side (forward side in the vehicular forward-rearward direction when the outlet pipe 13 is installed to the vehicle 1) in the second direction Y (FIG. 1) of the chamber case 5. In a rectangular shape of the chamber case 5 projected in plan view, the inlet pipe 12 (and the inlet port 8) and the outlet pipe 13 (and the outlet port 14) are disposed toward corners opposing each other on one diagonal line.

In plan view, the upper case 10 has: i) a first half which is deep (high) in a first side (rear side in the vehicular forward-rearward direction when the upper case 10 is installed to the vehicle 1) in the second direction Y (FIG. 1), and ii) a second half which is shallow (low) in a second side (forward side in the vehicular forward-rearward direction when the upper case 10 is installed to the vehicle 1) in the second direction Y (FIG. 1), thereby forming lengthy upper walls 10a, 10b serially disposed stepwise connected by a vertical wall 10e. Meanwhile, the lower case 11 is formed shallow (high) in a side with the outlet pipe 13, specifically, a substantially rectangular first bottom wall 11a on a side adjacent to the inlet pipe 12 and the substantially rectangular second bottom wall 11b on a side adjacent to the outlet pipe 13 are serially formed via an inclined wall 11c, in plan view, causing no change in depth in the second direction Y (shorter).

That is, as shown in FIG. 7, the chamber (hereinafter, otherwise referred to as "space" or "cavity") in the chamber case 5 includes: i) a main flow channel 18W having a large flow channel cross section and ii) a sub-flow channel 18N having a small flow channel cross section. The main flow channel 18W and the sub-flow channel 18N are disposed in parallel and united, forming an asymmetrical flow channel cross section. In this case, the main flow channel 18W has smaller air vent resistance than that of the sub-flow channel 18N and therefore is more likely to flow the air. Therefore, as schematically shown with arrows in FIG. 8, the air flow quantity in the main flow channel 18W side is larger than the air flow quantity in the sub-flow channel 18N side.

The cavities 18N, 18W (the chamber) inside the chamber case 5 serves as an air passage in an upstream of the electric fan 4. That is, operating the electric fan 4 introduces the air into the chambers 18N, 18W from inside the vehicle compartment 1A via the inlet port 8. Then, the air flows in the chambers 18N, 18W and gets out to the electric fan 4 from the outlet port 14 by way of the outlet duct 19 (FIG. 11).

Then, as the case may be, a swirling flow is caused adjacent to the outlet port 14. The above swirling flow is likely to be caused, for example, in the following cases:

Case i) the asymmetrical flow channel cross section of the sub-flow channel 18N and main flow channel 18W, according to the embodiment, and Case ii) when the inlet port 8 and the outlet port 14 are disposed on opposing sides in such a manner as to be offset relative to a center of the cross sections of the sub-flow channel 18N and main flow channel 18W (the chamber), according to the embodiment.

In either of the above cases i) and ii), the above swirling flow may increase the air vent resistance, failing to ensure a certain flow quantity.

Then, according to the embodiment, a plate 15 as a swirling flow suppressing member is provided in the chamber, thus suppressing the swirling flow which may be caused adjacent to the outlet port 14. FIG. 9A and FIG. 9B each show a flow line with the plate 15 provided, according to the embodiment.

Comparative Example

Meanwhile, FIG. 10A and FIG. 10B each show a flow line without the plate 15, according to a comparative example.

Comparing FIGS. 9A, 9B with FIGS. 10A, 10B, it is obvious that providing the plate 15 can weaken the magnitude of the swirling flow, especially, adjacent to the outlet port 14.

According to the embodiment, as shown in FIG. 8, the plate 15 protrudes from a side wall 10c of the upper case 10, and extends toward a central axis C side from a peripheral edge 14A side of the outlet port 14. With the plate 15 extending toward the central axis C side from the peripheral edge 14A side of the outlet port 14, the plate 15 can easily be set utilizing a side wall of the chamber case 5 (the side wall 10c of the upper case 10, according to the embodiment). In this case, the plate 15 can be unitedly molded with the upper case 10, serving as a part of the upper case 10. It is more preferable to unite the plate 15 with both of the upper wall 10b and the side wall 10c. With the above structure, the plate 15 can be more firmly held.

As shown in FIG. 10B without the plate 15, a center (eddy center) of the swirling flow adjacent to the outlet port 14 exists adjacent to the central axis C of the outlet port 14. Therefore, it is not necessary to so provide the plate 15 as to extend between the opposing peripheral edges 14A (see FIG. 8) with the central axis C located in between. In other words, the swirling flow can be weakened (suppressed) by the plate 15 extending from the peripheral edge 14A side to the central axis C side, according to the embodiment. Herein, the plate 15 extending between the opposing peripheral edges 14A with the central axis C located in between may cause a larger friction between the flow and a face 15a (swirling flow suppressing face extending along the central axis C) of the plate 15, thus increasing the air vent resistance. Therefore, a side edge 15c of the plate 15 is so configured as to substantially coincide with the central axis C as shown in FIG. 11, or substantially parallel to the central axis C.

Moreover, according to the embodiment, the plate 15 is disposed in such a position or posture that the face 15a of the plate 15 is along the central axis C (coolant-exhausting direction of the outlet port 14), more preferably, is parallel to the central axis C or includes the central axis C. With the above position or posture, the face 15a of the plate 15 can be substantially perpendicular to the direction of the swirling flow (i.e., in the chamber on upstream side of an opening edge 13a, the swirling flow hits substantially perpendicularly to the face 15a of the plate 15), thus efficiently blocking the swirling flow. According to the embodiment, the face 15a of the plate 15 is along the central axis C. The face 15a not precisely parallel to the central axis C can, however, also bring about a like effect. That is, as long as the swirling flow can be decreased, the face 15a may have a slight angle relative to the central axis C.

Moreover, according to the embodiment, from the inlet port 8's central axis in plan view, the plate 15 is disposed farther than the central axis C {i.e., in a region causing that i) a first distance between the plate 15 and the inlet port 8's central axis is larger than ii) a second distance between the central axis C and the inlet port 8's central axis; that is, in a region substantially leftward relative to the central axis C in FIG. 8}. Reason for the above positioning is summarized below:

On a side nearer than the central axis C to the inlet port 8 (i.e., when the first distance is smaller than the second distance), the flow speed is higher, thereby increasing the air vent resistance attributable to the friction between the flow and the face 15a of the plate 15.

Moreover, according to the embodiment, the plate 15 is disposed on the sub-flow channel 18N side for the following cause:

As described above, the flow quantity in the main flow channel 18W is larger than in the sub-flow channel 18N, so the air vent resistance attributable to the friction between the flow and the face 15a of the plate 15 may be increased.

Moreover, as shown in FIG. 11, according to the embodiment, the plate 15's lower edge 15b adjacent to the outlet port 14 side is substantially parallel to the opening edge 13a (port end) on the chamber side of the outlet port 14.

Herein, for obtaining an optimum value of a space distance H from the opening edge 13a to the lower edge 15b of the plate 15, the inventors have studied respective air vent resistances for various space distances H. FIG. 12A and FIG. 12B show pressure loss variation (improvement; pressure loss decrease) with the space distances H varied, based on a standard pressure loss (differential pressure=0) between the inlet port 8 and the outlet port 14 in a state where the plate 15 is not provided. The graph in FIG. 12A shows that the higher the ordinate is, the lower the pressure loss is, in other words, the smaller the air vent resistance is.

FIG. 12A shows that the air vent resistance in the chamber is smallest in a position A (i.e., apex of graph in FIG. 12A) where the lower edge 15b of the plate 15 slightly has the space distance H (about 5 mm to about 10 mm) from the opening edge 13a of the outlet port 14 to inside of the chamber. Reason for the above is summarized below:

Moving the lower edge 15b of the plate 15 toward the opening edge 13a side, and inserting the plate 15 into the outlet pipe 13 increase the plate 15's face area contacting the swirling flow, thereby increasing the effect of suppressing the swirling flow. However, the above operation increases the air vent resistance attributable to the friction between the flow and the plate 15.

From FIG. 12A and FIG. 12B, it is obvious that the plate 15 even proceeding more inward in the outlet pipe 13 over the opening edge 13a (to the outlet duct 19 side), in other words, the minus space distance H, can bring about an effect of decreasing the air vent resistance, though the improvement (effect of pressure loss decrease) in such a case is small (see for example, 0.01 in FIG. 12B).

Herein, according to the embodiment, as shown in FIG. 11, 1) an annular wall part 13c overhanging at a constant width from an outer periphery wall part 13b to the inside is provided in a part where the outlet duct 19 is inserted into the outlet pipe 13, 2) an inner wall part 13d protrudes toward the opening edge 13a side from an inner edge of the annular wall part 13c, and 3) an area adjacent to the opening edge 13a is annularly bulged from the second bottom wall 11b to inner side of the chamber, to thereby form a bulged part 13e. Moreover, a head end of the outlet duct 19 abuts on the annular wall part 13c so as to serve as a positioner, and the inner face of the bulged part 13e and the inner face of the inner wall part 13d are each enlarged into a funnel shape toward the inner side of the chamber, to thereby form a smooth flow which is unlikely to cause exfoliation, eddy and the like.

Modified Example

Figure 13:
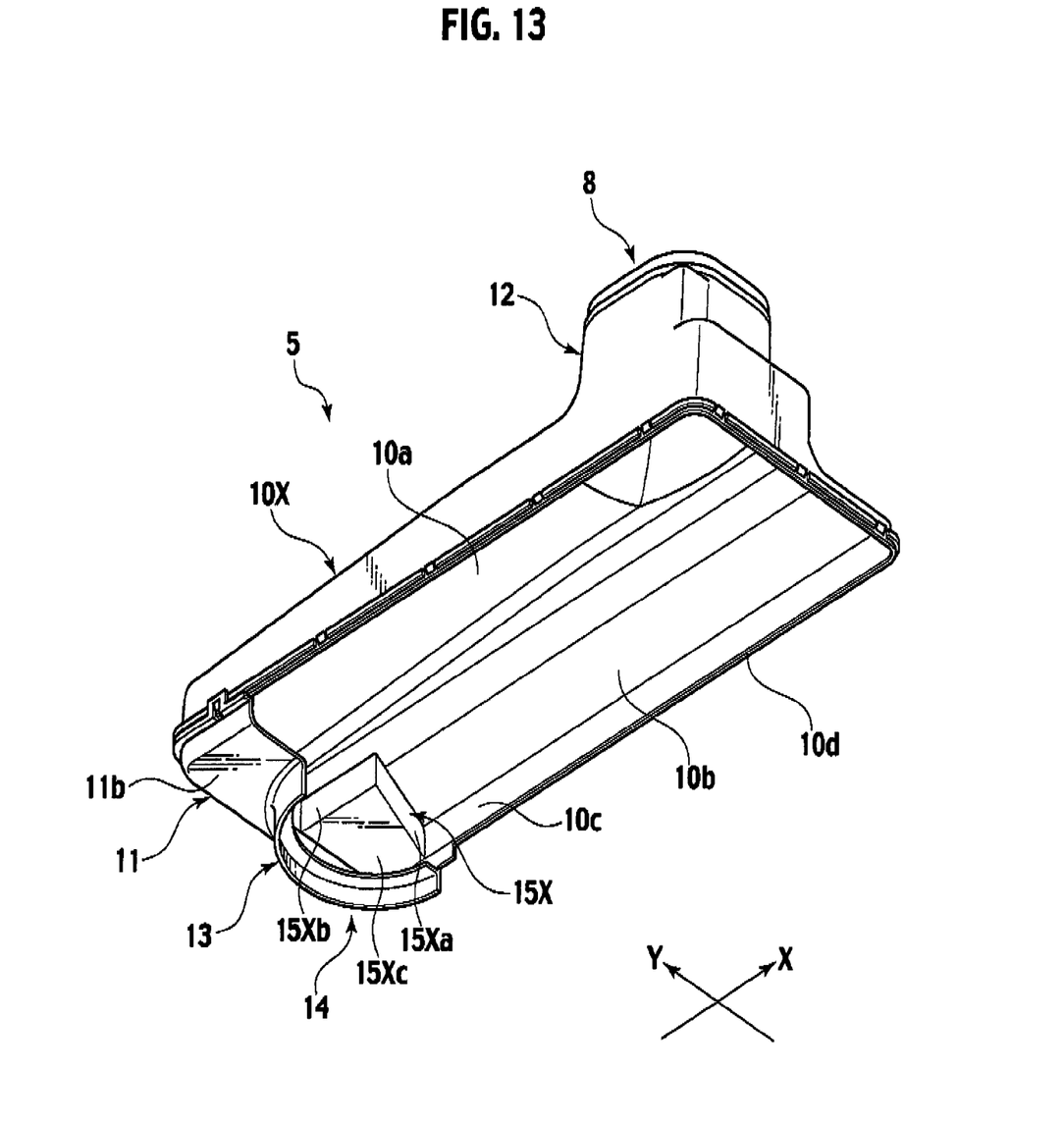
FIG. 13 is a lower perspective view showing a state where the lower case of the chamber case of the duct structure 2 of a modified example of the embodiment is partly cut away, to thereby expose the inner part (the chamber) of the chamber case.
Figure 14:
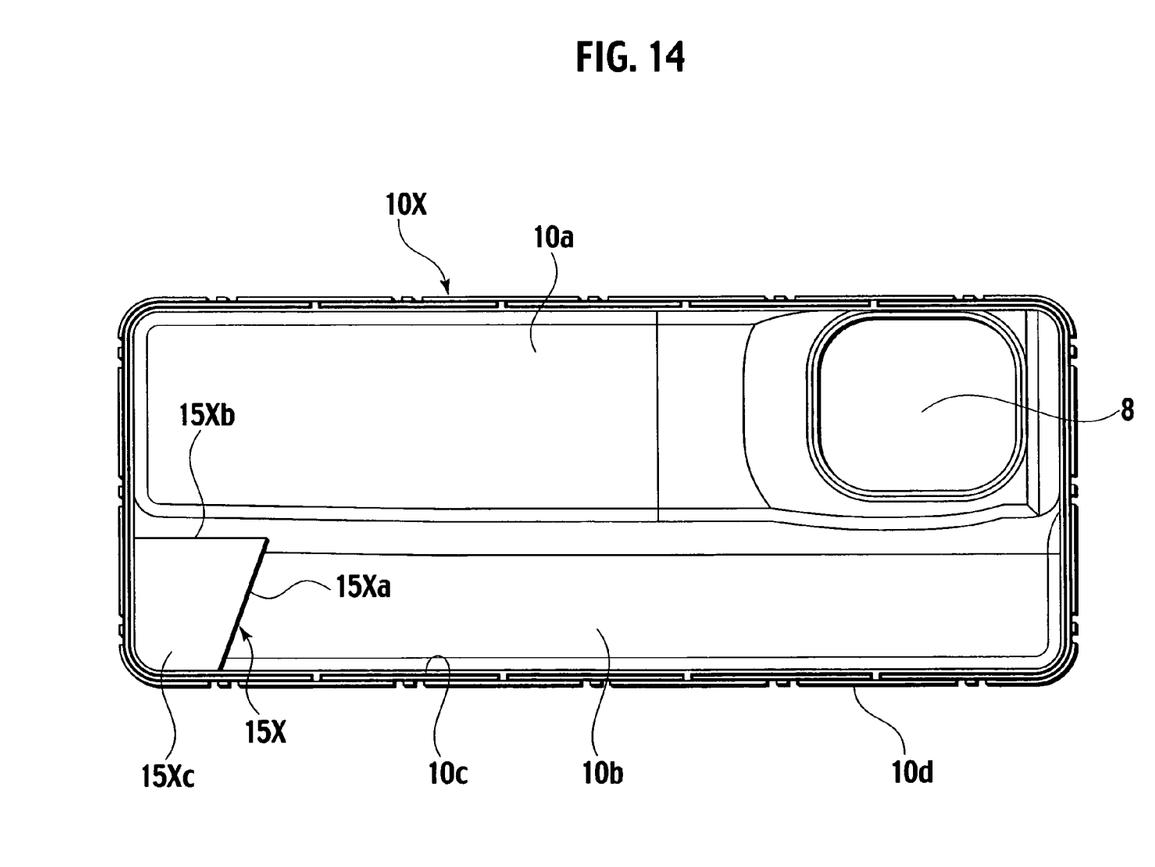
FIG. 14 is a lower plan view of an upper case of the chamber case, according to the modified example of the embodiment of the present invention.

Then, a duct structure 2 of a modified example of the embodiment is to be set forth. FIG. 13 is a lower perspective view showing a state where the lower case 11 of the chamber case 5 of the duct structure 2 of the modified example of the embodiment is partly cut away, to thereby expose the inner part (the chamber) of the chamber case 5. FIG. 14 is a lower plan view of an upper case 10X of the chamber case 5.

In place of the plate 15, a block 15X as a swirling flow suppressing member is disposed at the upper case 10X, according to the modified example. The block 15X includes: i) a substantially vertical first side face 15Xa (swirling flow suppressing face) in a position substantially the same as that of the face 15a of the plate 15, ii) a substantially vertical second side face 15Xb along the first direction X (longitudinal direction) of the chamber case 5, and iii) a substantially horizontal bottom face 15Xc in a position substantially the same as that of the lower edge 15b of the plate 15 (see FIG. 11). The block 15X can bring about an effect approximately the same as that brought about according to the embodiment using the plate 15.

Herein, having higher rigidity and strength than those of the plate 15, and being more easily fixed to the chamber case 5 (the upper case 10X) than the plate 15, the block 15X can be fixed more firmly, which is an advantage. Moreover, the block 15X can be a part of the upper case 10X. Specifically, forming (denting) the upper wall 10b toward the lower case 11 side such that an inner wall face of the upper wall 10b forms the block 15X as a part protruding into the chamber is allowed. As a matter of course, the block 15X can be formed literally as a block.

Otherwise, forming the block 15X by providing a plurality of plates can bring about the like effect. In this case, three plates may be used for forming the first side face 15Xa, second side face 15Xb and bottom face 15Xc of the block 15X, or two plates may be used for forming only the first side face 15Xa and second side face 15Xb.

Meanwhile, forming the block 15X with the sound absorbing material 17 as described above can increase the sound absorbing effect (silencing effect), which is an advantage. In this case, using adhesion and the like can easily fix the sound absorbing material 17 to the upper wall 10b.

The embodiment and the modified example thereof have been set forth under the present invention. The present invention is, however, not limited to the above embodiment or the modified example thereof and can be varied to further modifications. That is, the chamber case 5 according to the embodiment is described merely as an example. When the swirling flow is caused to the outlet port 14 of a chamber case (duct) having another form, properly modifying the present invention for the another form can likewise suppress the swirling flow, thus suppressing the air vent resistance increase.

This application is based on a prior Japanese Patent Application No. P2006-185861 (filed on Jul. 5, 2006 in Japan). The entire contents of the Japanese Patent Application No. P2006-185861 from which priority is claimed are incorporated herein by reference, in order to take some protection against translation errors or omitted portions.

The scope of the present invention is defined with reference to the following claims.

What is claimed is:

1. A duct structure, comprising:
a vessel forming therein a chamber, the vessel including:
an inlet port,
an outlet port,
wherein the vessel is configured such that a fluid flows into the chamber through the inlet port and flows out of the chamber through the outlet port, and
a swirling flow suppressing member disposed in a position inside the chamber adjacent to the outlet port, wherein the swirling flow suppressing member is configured to suppress a swirling flow from occurring to or adjacent to the outlet port, wherein
the chamber includes:
a main flow channel, and
a sub-flow channel disposed substantially parallel to the main flow channel in such a configuration as to communicate with the main flow channel, and smaller than the main flow channel in cross section,
the outlet port is configured to communicate with the main flow channel and the sub-flow channel, and
the swirling flow suppressing member is disposed on a sub-flow channel side.

2. A duct structure, comprising:
a vessel forming therein a chamber, the vessel including:
an inlet port,
an outlet port,
wherein the vessel is configured such that a fluid flows into the chamber through the inlet port and flows out of the chamber through the outlet port, and
a swirling flow suppressing member disposed in a position inside the chamber adjacent to the outlet port, wherein the swirling flow suppressing member is configured to suppress a swirling flow from occurring to or adjacent to the outlet port, wherein
the swirling flow suppressing member includes a swirling flow suppressing face extending in a fluid-exhausting direction of the outlet port, to thereby suppress the swirling flow from occurring to or adjacent to the outlet port,
the swirling flow suppressing member is disposed inside the chamber in a direction of a central axis of the outlet port, in such a configuration as to have a space distance relative from an opening edge on the chamber side of the outlet port,
a lower edge of the swirling flow suppressing member is disposed on an outlet port side, and is substantially parallel to the opening edge on the chamber side of the outlet port, and
an air vent resistance in the chamber is smallest in a position where the lower edge of the swirling flow suppressing member slightly has a space distance from the opening edge of the outlet port to inside of the chamber.

3. The duct structure according to claim 2, wherein,
the lower edge of the swirling flow suppressing member has the space distance from the opening edge of the outlet port to the inside of the chamber by about 5 mm to about 10 mm.

4. The duct structure according to claim 3, wherein,
the vessel is a chamber case including an upper case and a lower case, and
a substantially cylindrical outlet pipe having an inner wall part, an annular wall part and an outer periphery wall part protrudes from the lower case.

5. The duct structure according to claim 4, wherein,
the annular wall part overhanging at a constant width from the outer periphery wall part to inside is provided in a part where an outlet duct is inserted into the outlet pipe,
the inner wall part protrudes toward the opening edge side from an inner edge of the annular wall part, and
an area adjacent to the opening edge is annularly bulged from a bottom wall of the lower case to an inner side of the chamber, to thereby form a bulged part.

6. The duct structure according to claim 5, wherein,
a head end of the outlet duct abuts on the annular wall part so as to serve as a positioner, and an inner face of the bulged part and an inner face of the inner wall part are each enlarged into a funnel shape toward the inner side of the chamber.

7. A duct structure, comprising:

a vessel forming therein a chamber, the vessel including:
an inlet port,
an outlet port,
wherein the vessel is configured such that a fluid flows into the chamber through the inlet port and flows out of the chamber through the outlet port, and
a swirling flow suppressing member disposed in a position inside the chamber adjacent to the outlet port, wherein the swirling flow suppressing member is configured to suppress a swirling flow from occurring to or adjacent to the outlet port, wherein
the swirling flow suppressing member is shaped substantially into a block having a swirling flow suppressing face.

8. The duct structure according to claim 7, wherein the block includes a plurality of plates.

9. The duct structure according to claim 8, wherein three of the plurality of plates form a first side face, a second side face and a bottom face of the block, and
one of the first side face and the second side face is configured to serve as the swirling flow suppressing face.

10. The duct structure according to claim 8, wherein two of the plurality of plates form a first side face and a second side face of the block, and
one of the first side face and the second side face is configured to serve as the swirling flow suppressing face.

11. The duct structure according to claim 7, wherein the block includes a sound absorbing material which is fixed to an upper wall of an upper case of the vessel.

* * * * *